(12) United States Patent
Orman et al.

(10) Patent No.: US 9,743,202 B2
(45) Date of Patent: *Aug. 22, 2017

(54) SYSTEM FOR LOCALIZING SOUND SOURCE AND THE METHOD THEREFOR

(71) Applicant: ABB Schweiz AG, Baden (CH)

(72) Inventors: Maciej Orman, Radziszow (PL); Detlef Pape, Nussbaumen (CH)

(73) Assignee: ABB Schweiz AG (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/760,755

(22) PCT Filed: Mar. 21, 2013

(86) PCT No.: PCT/EP2013/055961
§ 371 (c)(1),
(2) Date: Jul. 14, 2015

(87) PCT Pub. No.: WO2014/114364
PCT Pub. Date: Jul. 31, 2014

(65) Prior Publication Data
US 2015/0358752 A1 Dec. 10, 2015

(30) Foreign Application Priority Data
Jan. 23, 2013 (CN) .......................... 2013 1 0024486

(51) Int. Cl.
*H04R 29/00* (2006.01)
*G01S 3/802* (2006.01)
(Continued)

(52) U.S. Cl.
CPC ............ *H04R 29/004* (2013.01); *G01S 3/809* (2013.01); *G01S 3/8022* (2013.01); *G01S 3/8032* (2013.01); *G01S 5/20* (2013.01)

(58) Field of Classification Search
CPC ......... G01S 3/8022; H04R 1/20–1/406; H04R 3/00; H04R 3/005; H04R 29/004; H04R 29/005; H04R 2430/20; H04S 7/40
See application file for complete search history.

(56) References Cited

U.S. PATENT DOCUMENTS 3,895,340 A 7/1975 Gilmour
6,473,363 B1 10/2002 Oetzmann
(Continued)

FOREIGN PATENT DOCUMENTS

FR 2761481 A1 10/1998
JP S59111072 A 6/1984
(Continued)

OTHER PUBLICATIONS

ISA/EP International Search Report issued Apr. 3, 2014 re PCT Application No. PCT/EP2013/055961, filed Mar. 21, 2013.
(Continued)

*Primary Examiner* — Mark Fischer
(74) *Attorney, Agent, or Firm* — Taft Stettinius & Hollister LLP

(57) ABSTRACT

It is provided a system for localizing a sound source and a method therefor. The system includes a movable unit, being adapted for free movement and being integrated with a microphone; a motion tracking unit; and a processing unit, being adapted for receiving microphone signal and motion tracking unit signal and obtaining information on a direction from which sound from the sound source arrives using the microphone signal and motion tracking unit signal obtained during movement of the movable unit. By having the system and the method therefor, it is helpful for solving at least one of the technical problems: the complexity and a large volume of an acoustic camera for localization of a sound (Continued)

source; the restriction of the movement of the microphone in a sound source localization system.

12 Claims, 8 Drawing Sheets

(51) Int. Cl.
  *G01S 3/803* (2006.01)
  *G01S 3/809* (2006.01)
  *G01S 5/20* (2006.01)

(56) References Cited

U.S. PATENT DOCUMENTS

| | | | |
|---|---|---|---|
| 8,072,839 B2 | 12/2011 | Guigne et al. | |
| 2008/0239874 A1 | 10/2008 | Kemp et al. | |
| 2009/0081947 A1* | 3/2009 | Margis | H04B 7/18508 |
| | | | 455/3.02 |
| 2010/0239115 A1* | 9/2010 | Richardson | H04R 5/033 |
| | | | 381/384 |
| 2012/0114131 A1* | 5/2012 | Tricoukes | H04R 1/105 |
| | | | 381/74 |
| 2013/0142347 A1* | 6/2013 | Lord | H04R 29/005 |
| | | | 381/58 |
| 2016/0187454 A1* | 6/2016 | Orman | G01S 3/8022 |
| | | | 367/124 |

FOREIGN PATENT DOCUMENTS

| | | |
|---|---|---|
| JP | 2000338214 A | 12/2000 |
| JP | 201174538 A | 6/2001 |
| JP | 2006166007 A | 6/2006 |

OTHER PUBLICATIONS

John W. Fay et al, Bearing Estimation Accuracy with a Synthetic Aperture, IEEE, US, vol. 4, May 23, 1989.

Richardj. Kozick et al, Sensor Localization Using Acoustic Doppler Shift with a Mobile Access Point, IEEE, US, Jul. 17, 2005.

Chinese Office Action; The State Intellectual Property Office of the People's Republic of China; Dated Aug. 1, 2016; Chinese Patent Application No. 201310024486.8; 13 pgs.

* cited by examiner

SYSTEM FOR LOCALIZING SOUND SOURCE AND THE METHOD THEREFOR

TECHNICAL FIELD

The invention relates to the field of localization of a sound source, and more particularly to a system for evaluating the direction of a sound source and the method therefor.

BACKGROUND ART

Acoustic analysis is a method which today is often used for example in speech recognition however it is rarely ever used in industry application as a condition monitoring technique. The quality of acoustic monitoring is very much dependent on the background noise of the environment, which the machine is operated at. The effect of background noise can be mitigated by sound source localization. Sound source localization might be performed by acoustic camera.

Sound analysis can be an important quality aspect of condition monitoring tool. When faults in machinery and plant installations occur, they can often be detected by a change in their noise emissions. In this way, acoustic camera makes the hearing procedure automated and more objective. Current technologies of acoustic camera can be used to visualize sounds and their sources. Maps of sound sources that look similar to thermo graphic images are created. Noise sources can be localized rapidly and analysed according to various criteria. From U.S. Pat. No. 3,895,340 and U.S. Pat. No. 8,072,839, an acoustic camera consists of some sort of video device, such as a video camera, and a multiple of sound pressure measuring devices, such as microphones, sound pressure is usually measured as Pascal's (Pa). The microphones are normally arranged in a pre-set shape and position with respect to the camera.

The idea of acoustic camera is to do noise/sound source identification, quantification and perform a picture of acoustic environment by array processing of multidimensional acoustic signals received by microphone array and to overlay that acoustic picture to the video picture. It is a device with integrated microphone array and digital video camera, which provides visualization of acoustic environment. Possible applications of acoustic camera as test equipment are nondestructive measurements for noise/sound identification in interior and exterior of vehicles, trains and airplanes, measurement in wind tunnels, etc. Acoustic camera can also be built in complex platform such as underwater unmanned vehicles, robots and robotized platforms etc. When using microphone array consisting of a multiple of microphones, however, it may entail problems regarding the relatively high complexity, a relatively large volume, and a relatively high cost of the acoustic camera.

In some further conventional concepts according to JP Pat. No. 2001.174583, a few microphones are moved between measurements by way of drives, for example motors. The motion tracking of the microphones is done via detection of the parameters of the drives, for example the speed of the motor or the initial position of the motor. The motion of the microphones is limited due to the mechanical restriction of the drive, in other words, the microphone cannot move randomly and some route cannot be followed because of the restriction. Moreover, positional accuracy is limited here in many cases by the length of a sampled or "scanned" area. When moving microphones with motors, the problem of the accuracy of the position of the microphones arises. For example, problems may result due to tolerances of the motor or due to vibrations of the construction. Furthermore, the construction of the arrangement for moving microphones with motors without reflections at fixtures is difficult.

BRIEF SUMMARY OF THE INVENTION

The problems in the state of the art are at least partly overcome by the present subject-matter.

According to one aspect of the invention, a system for localizing a sound source is provided that includes: a movable unit, being adapted for free movement and being integrated with a microphone; a motion tracking unit; and a processing unit, being adapted for receiving microphone signal and motion tracking unit signal and obtaining information on a direction from which sound from the sound source arrives using the microphone signal and motion tracking unit signal obtained during movement of the movable unit.

According to another aspect of the invention, a method for localizing a sound source is provided that includes: obtaining microphone signal and motion tracking unit signal from a movable unit integrated with a microphone and an motion tracking unit during free movement of the movable unit; and determining information on a direction from which sound from the sound source arrives using the microphone signal and the movable unit signal.

The invention is also directed to an apparatus for carrying out the disclosed methods and including apparatus parts for performing each described method steps. These method steps may be performed by way of hardware components, a computer programmed by appropriate software, by any combination of the two or in any other manner. Furthermore, the invention is also directed to methods by which the described apparatus operates. It includes method steps for carrying out every function of the apparatus.

Embodiments, aspects, details and advantages of the present subject-matter are furthermore evident from the dependent claims, the description, and the drawings.

By having the system and the method therefor as explained herein, at least one of the technical problems may be solved:

1. the higher complexity and a large volume of an acoustic camera for localization of a sound source;
2. the restriction of the movement of the microphone in a sound source localization system.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
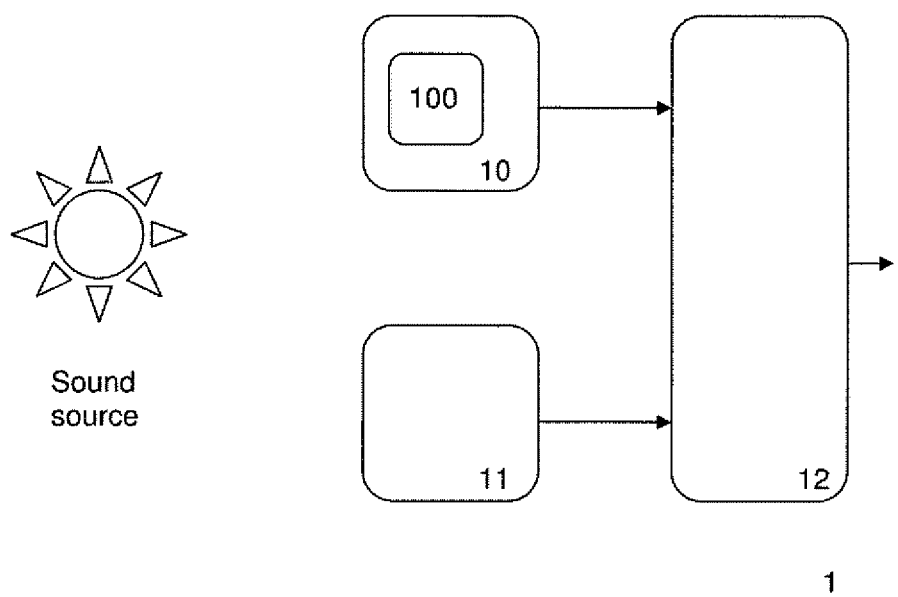
FIG. 1 is a block diagram of a system for localizing a sound source according to one embodiment of present invention.

FIG. 1 is a block diagram of a system for localizing a sound source according to one embodiment of present invention. The system according to FIG. 1 is designated with 1 in its entirety. As shown in FIG. 1, the system 1 includes a movable unit 10, a motion tracking unit 11 and a processing unit 12. The movable unit 10 may be integrated with a microphone 100. The movable unit 10 is movable with freedom with respect to a sound source in a random path, for example in linear movement, in circular movement, in forward and backward movement, and so on. The motion tracking unit 11 is adapted for tracking the movement of the movable unit 10. This allows the flexibility of the selection of the movable unit path set by the operator.

Figure 2:
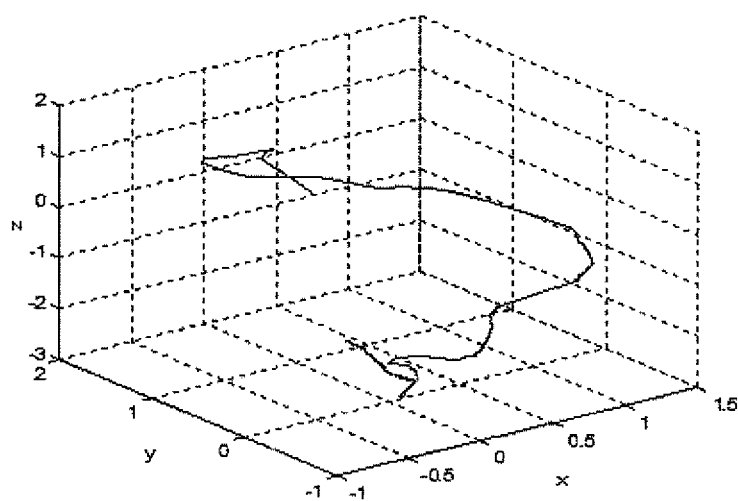
FIG. 2 illustrates a random movement of the movable unit according to one embodiment of present invention.

FIG. 2 illustrates a random movement of the movable unit according to one embodiment of present invention. The microphone 100 is adapted for collecting the sound wave that transmits from the sound source and arrives at the microphone 100, and thus generating the microphone signal representing a value of a component of the collected sound wave. The motion tracking unit 11 is adapted for tracking a movement of the movable unit 10 and the microphone 100 integrated therewith where the sound wave is detected, and thus generating the motion tracking unit signal representing the position and velocity of the movable unit 10 and the microphone 100 integrated therewith. The movement can hereby be in the x, y, z direction as well as a rotation of the movable unit. The processing unit 12 is adapted for receiving the microphone signal of the microphone 100 of the movable unit 10 and motion tracking unit signal from the motion tracking unit 11 and obtaining information on a direction from which sound from the sound source arrives using the movable unit signal obtained during movement of the movable unit 10.

In the following, the functioning of the system 1 will be explained briefly. The processing unit 12 is capable of evaluating the microphone signal having been received or recorded or sampled with respect to the movement of the microphone 100 with the movement of the movable unit 10 from an initial position. Hence, the microphone signal includes the Doppler Effect frequency shift. By determining the Doppler effect frequency shift from the recorded signals collected by the same microphone during its movement, the relative direction of the movable unit to the sound source can be calculated and in combination with the position signals the location of the sound source can be determined. This would provide a simple system with lower costs and low volume for the sound source location. In addition, due to the integration of the microphone into the movable unit that can follow random path during its movement, the position for collecting the sound wave can be selected with less restriction. In addition, the accuracy of the motion tracking signal can be increased because the movable unit is not driven by devices that have tolerances, vibrations, or reflections at fixtures. Moreover, the motion tracking unit signal is expressive and good for indication of the movement of the microphone, and thus the accuracy of the position and velocity of the microphone arises.

Figure 3A:
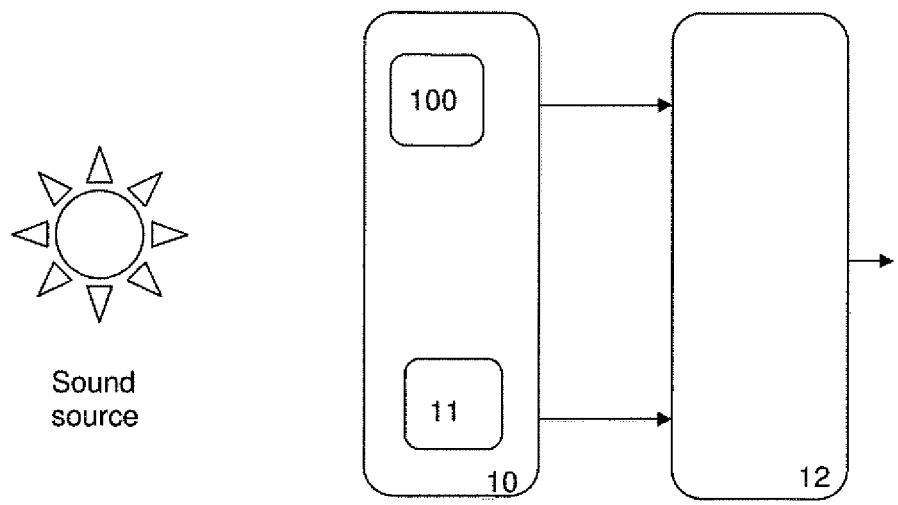
FIG. 3A is a block diagram of a system for localizing a sound source according to one embodiment of present invention.

FIG. 3A is a block diagram of a system for localizing a sound source according to one embodiment of present invention. In this embodiment according to FIG. 3A, it is possible to integration of the motion tracking unit 11 into the movable unit 10, thus the motion tracking unit 11 is movable together with the movable unit 10. For example, the motion tracking unit 11 may be an IMU (inertial measurement unit) including gyroscope, and it may be integrated with the movable unit 10 together with the microphone 100. Thus, the movable unit 10 can simultaneously measure a combination of acoustic signal, at least one direction acceleration signals, at least one direction gyroscope signals. By having such configuration, the system 1 becomes more compact.

Figure 3B:
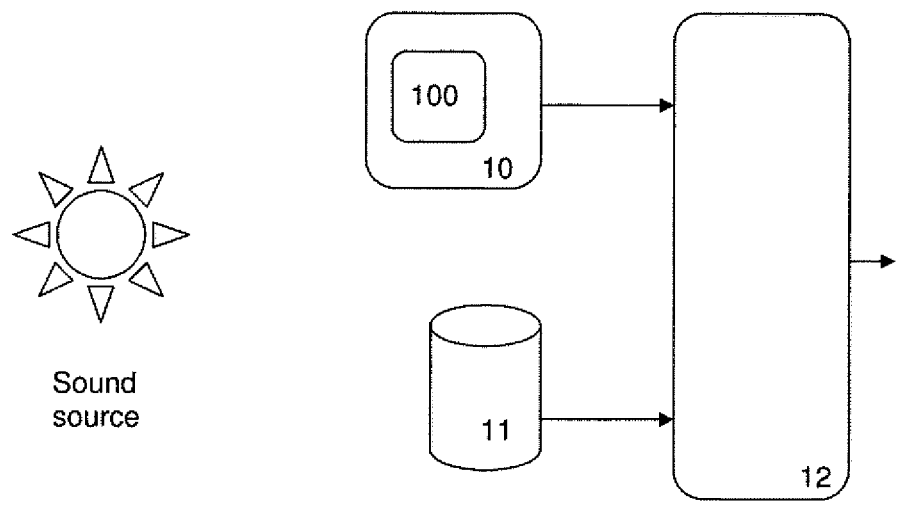
FIG. 3B is a block diagram of a system for localizing a sound source according to one embodiment of present invention.
Figure 3C:
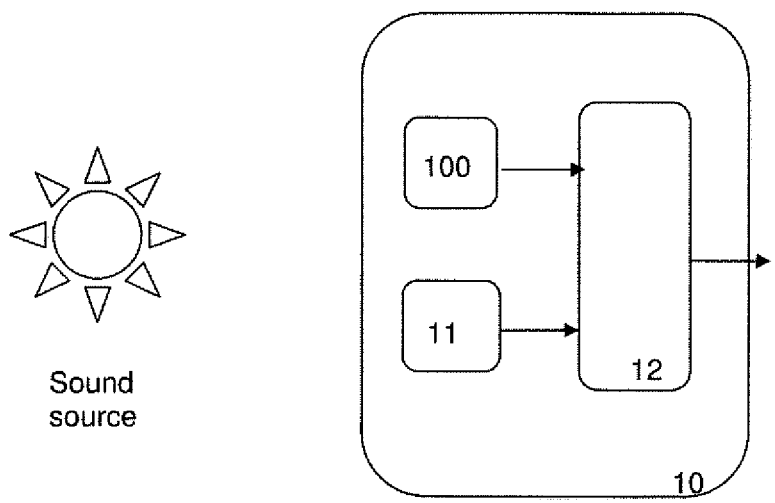
FIG. 3C is a block diagram of a system for localizing a sound source according to one embodiment of present invention.

FIG. 3B is a block diagram of a system for localizing a sound source according to one embodiment of present invention. In this embodiment according to FIG. 3B, the motion tracking unit 11 may be a vision tracking system which is separate from the movable unit 10 and generating the information about the velocity and position of the movable unit 10 by pattern recognition technology. FIG. 3C is a block diagram of a system for localizing a sound source according to one embodiment of present invention. The processing unit 12 may be integrated with the movable unit 10. Of course, the processing unit 12 may be separated from the movable unit 10 and may be implemented by a personal computer. The system may further include a screen being adapted for optical visualizing the position of the sound source for presenting as a map of sound locations, for example the location of sound sources is displayed on a picture of the scanned area. The screen may be integrated with the movable unit or on a personal computer.

In some embodiments, the processing unit 12 may be further adapted for determine direction information on evaluation of a level of the microphone signal during the movement of the microphone 100 and the movable unit 10. The processing unit 12 may, for example, determine a sound level of the microphone 100 with respective to a maximum and/or minimum amplitude while the movable unit 10 is moving with respective to the initial position, and further adapted for providing the information on the direction depending on the sound level of the microphone signal and the motion tracking unit signal. In summary, it thus can be stated that different information can be extracted from the microphone signal. For example, using the Doppler Effect frequency shift, an influence of the Doppler Effect on the microphone signal can be evaluated. An amplitude of the microphones signal may also be employed for improving the precision of the direction determination. However, the microphone signal may also include a combination of the above-mentioned information.

In some embodiments, all the measurements may be performed by mobile phone.

Figure 4:
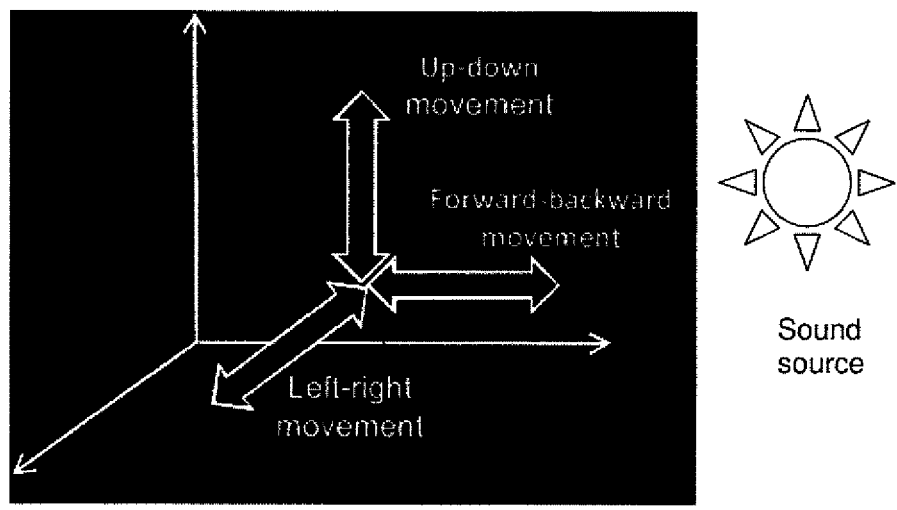
FIG. 4 shows a schematic illustration of typical movement of the movable unit according to one embodiment of present invention.

FIG. 4 shows a schematic illustration of typical movement of the movable unit according to one embodiment of present invention. As shown in FIG. 4, the movable unit 10 is at an initial position 30, where the acoustic signal should be recorded and microphone should not be moving. The stationary signal (assuming that the sound source is generating stationary signal) will be used as a reference in further analysis. The direction determination is based on the analysis of the non-stationary acoustic signal. Furthermore, to obtain such non-stationary signal it is required to perform movement of microphone while recording the acoustic signal.

Such movement can generally be performed in 3 directions: forward-backward to the object of interest, left-right and up-down as it presented in FIG. 4 or a combination of the movement components in the 3 directions, it needs to be performed in front of the object of interest. As shown in FIG. 3, as example, the movable unit 10 may move to position 31 in the direction of forward-backward, to position 32 in the direction of left-right, to position 33 in the direction of up-down, or a position along the direction as a combination of the above three directions. Hence, a distance of the microphone 100 and the movable unit 10 from the sound source varies in the movement from the initial position 30 to position 31, 32, 33. The closer the microphone will stand to the sound source the better resolution of the measurements it is possible to achieve.

Figure 5:
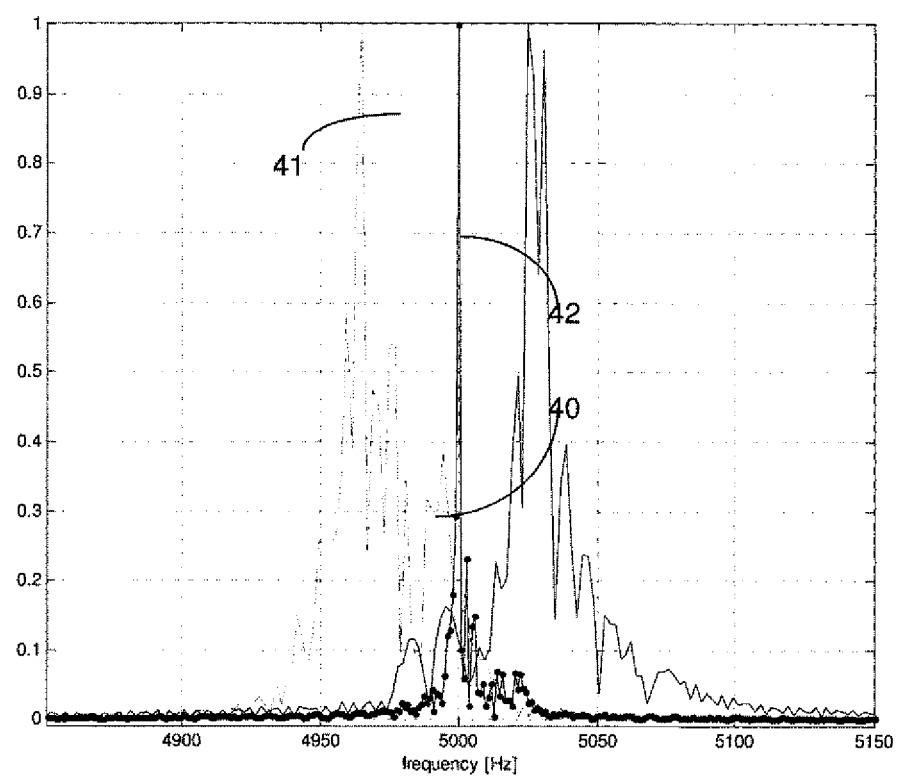
FIG. 5 shows a spectrum illustration of Doppler Effect frequency shift of the microphone signal provided by the microphone of the movable unit.

FIG. 5 shows a spectrum illustration of Doppler Effect frequency shift of the microphone signal provided by the microphone. For example, the sound source contains 5 kHz as a main frequency. At the initial position 30, the Doppler Effect frequency shift is minimum and/or even negligible. A first signal 40 is recorded, which means that the microphone 100 is not moving. A second signal 41 is recorded when the microphone 100 and the movable unit 10 are moving away from the sound source, while a third signal 42 is recorded when the microphone is getting closer to the sound source. As it is visible frequency peak at 5 kHz in case of the first signal 40 is relatively sharp which means that the frequency is constant in whole measurements period. It is possible to notice that second signal 41 is not a sharp peak any longer and it is clearly shifted to lower frequency while the third signal 42 is shifted into the higher frequency. The visible effect is known as a Doppler Effect. The above figure illustrating Doppler Effect proves that frequency shift is big enough to be measurable by the same microphone.

While performing acoustic measurements with moving microphone it is typical to simultaneously measure 3 direction acceleration signals, e.g. by a 3 direction gyroscope. Typically, contemporary mobiles phones got those sensors embedded. These measurements will be utilized to detect mobile phone path and speed. Alternatively, vision markers might be utilized to obtain microphone movement path and velocity.

In the following, details regarding the procedure when determining the direction from which the sound from the sound source arrives at the microphone will be described here. Here, it is assumed that the frequency of the sound source is known, for example, 5 kHz. The direction of the sound source with respective to the microphone may, for example, be described by a direction of a velocity that deviates from the velocity of the microphone and the movable unit in terms of the measure of the angle between the two velocities. This description may apply to visualization of 2-dimension or 3-dimension source localization. For example, if the velocity of the movable unit is known, the direction of the sound source may also be described by the unknown angle, and this leads to the need for determination of the unknown angle which will be described hereinafter.

Figure 6:
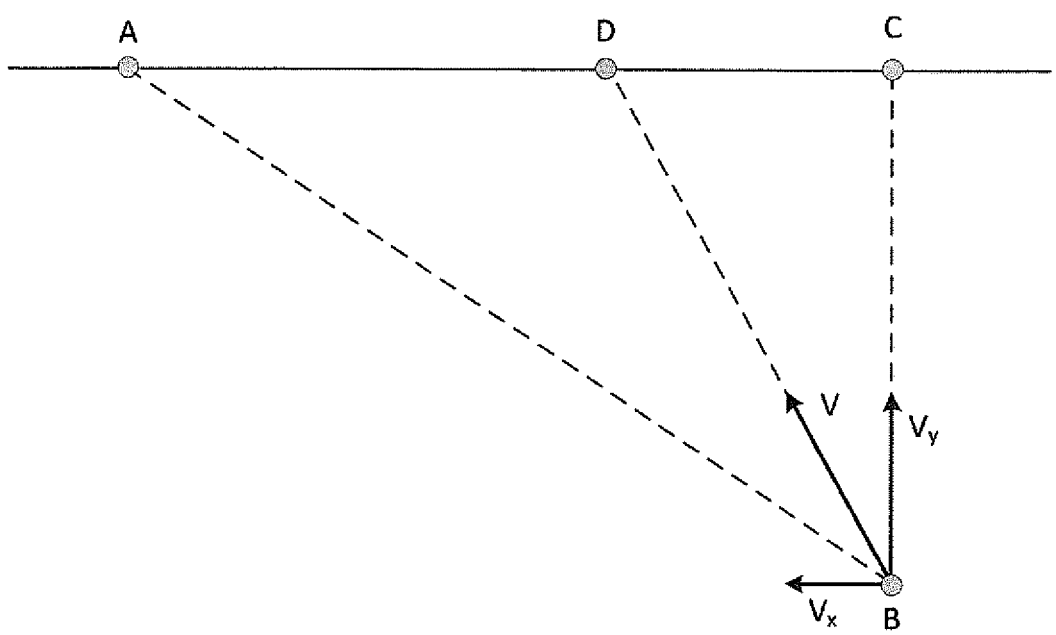
FIG. 6 shows a visualization of 2-dimension source localization according to one embodiment of present invention.

FIG. 6 shows a visualization of 2-dimension source localization according to one embodiment of present invention. Based on stationary measurements, the frequencies of interest should be selected. In this example our frequency of interest is 5 kHz. Then from the 2 direction speed path moment of time where speed is most constant should be selected. This speed we can marked as V. For the moment of time for which the speed V was selected in respective acoustic signal frequency shift of 5 kHz should be determined. Since such signal might be relatively short any methods like best fitting sinus should be better than standard FFT approach.

The Doppler Effect equation describe relation between speed of moving sound source or moving observer and frequency shift in acoustic signal recorded by observer. In presented case only the observer is moving. For this case the Doppler Effect equation looks as follows:

$$f_s = f_0 \left( \frac{v \pm v_0}{v} \right) \quad (1)$$

Where $f_s$ is frequency shift due to Doppler Effect, $f_0$ is actual sound source frequency, v is sound speed which we can assume as equal to 340 m/s, $v_0$ is the motion speed of the observer, in this case it is the speed of microphone. The sign of $v_0$ depends on the direction of speed in relation to sound source.

For proper localization of sound source C, distance |CB| between object of interest C and microphone at initial position B is required. In the example presented in motion speed at point B is equal to V and as it is possible to notice the microphone is heading to point D which is moved the left side of sound source C by α angle. By rearranging the eq. (1) to the form where $v_0$ will be on the left side of equation and assuming that microphone is getting closer to the sound source the equation got the following form:

$$v_0 = v \left( 1 - \frac{f_s}{f_0} \right) \quad (2)$$

If $f_0$ is the frequency of interest and $f_s$ is actual frequency shift of respective $f_0$ then $v_0$ is microphone speed in relation to the sound source C. Therefore we can write:

$$V_y = v_0 \quad (3)$$

In FIG. 6 this component of speed was marked as Vy. The cosines of angle α can be expressed as $$\cos(\alpha) = \frac{V_y}{V} \quad (4)$$

Substituting equation 3 in to eq 4 and use speed V obtain in previous it is possible to calculate angle α. By knowing the angle α it is possible to determine position of sound source as point C or point A as presented in FIG. 6.

Thus, it can, for example, be seen that in 2-dimension the sound source is in the direction along one of the two sides, BA and BC, of triangle BAC. Hence, based on the finding, a direction of the sound source can be determined. In summary, the processing unit 12 is adapted for evaluating a first Doppler Effect frequency shift of the first microphone signal with respect to a first directional movement of the movable unit from an initial position, and the processing unit 12 is adapted for providing the information on the direction depending on the first Doppler Effect frequency shift of the first microphone signal and the motion tracking unit signal.

In order to increase the accuracy of the determination of the sound source direction, the above procedure may be repeated for a different selection of velocity V at least once. By having such repetition, we may get another triangle B'A'C' with at least one side overlapping one of the sides of BA and BC of triangle BAC. Hence, based on the finding involving a combination of the two triangles BAC and B'A'C', the direction of the sound source can be determined in the direction from the intersection of the sides, for example BC and B'C'. In summary, the processing unit is further adapted for evaluating a second Doppler Effect frequency shift of a second microphone signal with respect to a second directional movement of the movable unit from the initial position and the processing unit is adapted for providing the information on the direction depending on the first Doppler Effect frequency shift and the second frequency shift of the first and second microphone signals and the motion tracking unit signals for the first and second directional movements of the movable unit.

Figure 7:
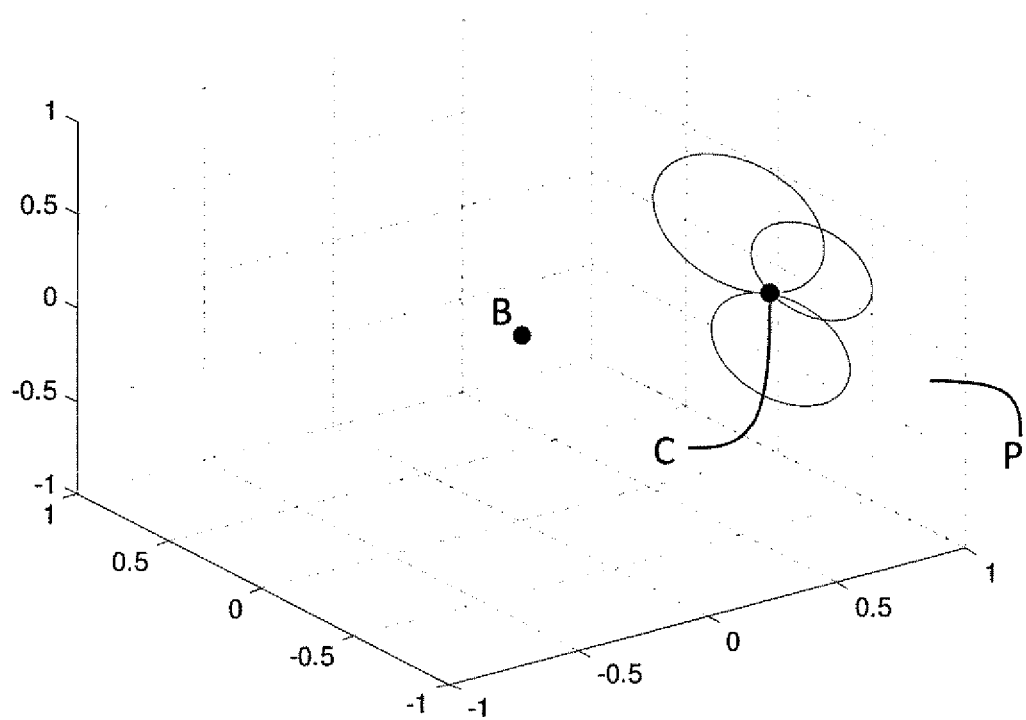
FIG. 7 shows a visualization of 3-dimension source localization according to one embodiment of present invention.
Figure 8:
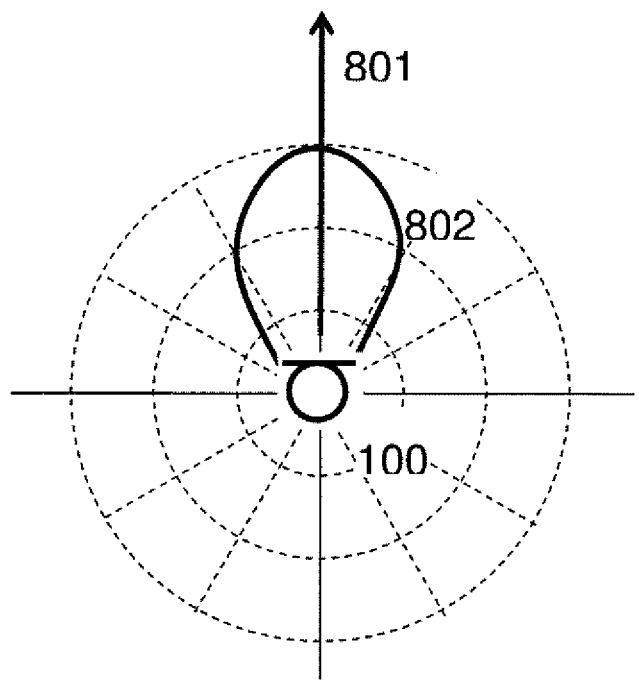
FIG. 8 shows a typical directional sensitivity of a microphone according to one embodiment of present invention.

FIG. 7 shows a visualization of 3-dimension source localization according to one embodiment of present invention. A 3D plane P may be created in such a way so it is perpendicular to our initial motion point B and its centre is in point C which is our object of interest (in this case it is also our sound source). In case of localization sound source in 3D angle α calculated may create cone which is vertex is at the point B. Common part of cone and plane P is creating the ellipses which is marked on as FIG. 7. While repeating calculation three times three different cones will be calculated and 3 different ellipses will be drawn. Common part of ellipses is our sound source C which in this case is also object of interest. While substituting the plane P with real photo of object of interest sound source localization might be visualized as propose in FIG. 7. Hence, based on the finding, a direction of the sound source can be determined in 3-dimension. In summary, the processing unit is adapted for evaluating a first, second and third Doppler Effect frequency shift of a first, second and third microphone signal with respect to a first, second and third directional movement of the movable unit from the initial position; and the processing unit is adapted for providing the information on the direction depending on the first, second and third Doppler Effect frequency shifts of the first, second and third microphone signals and the motion tracking unit signals for the first, second and third directional movements of the movable unit. Alternatively the sound amplitude could be also evaluated from the recorded sound signals for determining the sound source location. The sound sensitivity of a microphone varies with the direction of the sound source and FIG. 8 shows a typical directional sensitivity of a microphone according to one embodiment of present invention. The trajectory 802 shows the sensitivity of the microphone 100 for sound arriving under different angles. In the direction indicated by the arrow 801 the microphone 100 will reach its maximum sensitivity and thus the highest output level. By turning the movable unit 10 and thus the microphone 100 in such a way that the maximum and/or minimum output level is reached, the microphone unit will direct in the direction of the sound source and this direction can be determined.

Alternative also other sound amplitudes as e.g. the minimum sound level could be used for a direction detection. The level and the direction must only be clearly determinable. The shown sensitivity is a typical sensitivity of a microphone and will vary with the exact embodiment of the microphone and its environment. But the maximum sensitivity will only be achieved in certain direction and can be used for determining the direction of a sound source.

Figure 9:
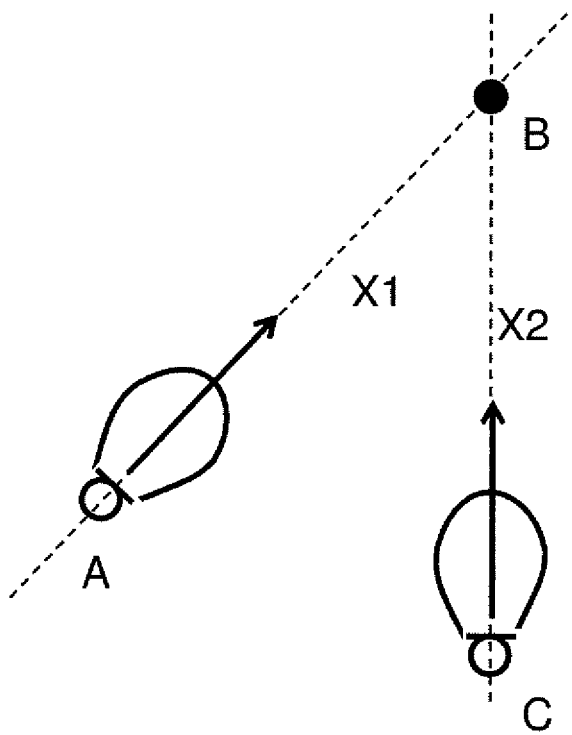
FIG. 9 shows the determination of a sound source location is according to the embodiment of FIG. 8.

FIG. 9 shows the determination of a sound source location is according to the embodiment of FIG. 8. At a known position A the microphone is turned in the direction X1 of its maximum and/or minimum amplitude and will thus direct to the location of the sound source B. At second known position C, which is not in line of the direction determined at position A, again the microphone is turned to its maximum and/or minimum amplitude and will give a second direction X2 measurement of the sound source location B. The intersection point of the two direction lines X1 and X2 will give the location of the sound source. The positions A and C are hereby determined with the motion tracking unit 11. The motion tracking can be one of the already above described methods or any other method for determining the positions A and C. Alternatively the motion tracking unit could also consist of two marked positions in the space, where the two measurements are performed.

Figure 10:
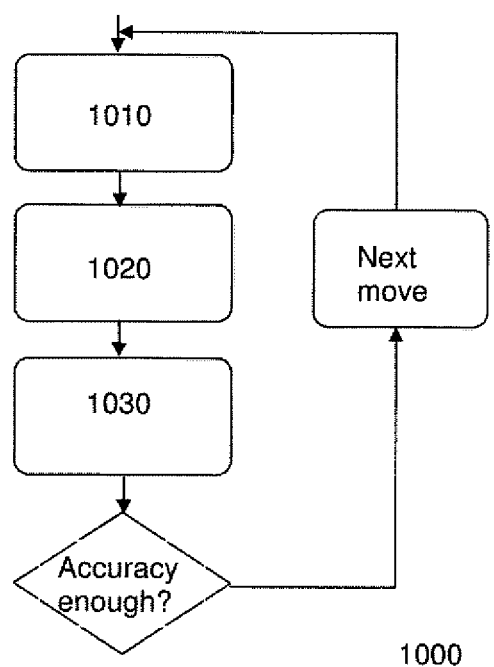
FIG. 10 shows a flowchart of a method for localizing a sound source according to one embodiment of present invention.

FIG. 10 shows a flowchart of a method for localizing a sound source according to one embodiment of present invention. The method 1000 includes, in step 1010, obtaining microphone signal and motion tracking unit signal from a movable unit integrated with a microphone and a motion tracking unit during free movement of the movable unit. It is determined a sampling rate at which microphone signal is sampled, based on a known frequency of the sound signal. For example, a sampled version of the microphone signal from the microphone 100 is present, which was generated by sampling the microphone signal at a sampling frequency at least twice bigger than the frequency of interest.

The method 1000 further includes, in a step 1020, determining a velocity and an initial position of the movable unit and the microphone on the basis of motion tracking unit signal, and determining a Doppler Effect frequency shift on the basis of the microphone signal.

The method 1000 further includes, in a step 1030, determining a direction of the microphone with respective to the sound source, based on an value of a Doppler Effect frequency shift and the motion tracking unit signal. For example, a Doppler Effect frequency shift among the microphone signals is dependent on the speed of the microphones with respective to the sound source. The offset of the Doppler Effect frequency shift indicates how great a speed of the movable unit is moving with respective to the sound source. For example, evaluation of the direction of the sound source may be performed according to the algorithm described according to FIGS. 6 and 7.

Alternatively, the method 1000 further includes, in a step 1010, evaluating a sound level of the microphone signal with respective to a maximum and/or minimum amplitude while the movable unit is moving with respect to the initial position, and in step 1030, providing the information on the direction depending on the sound level of the microphone signal and the motion tracking unit signal.

With different levels of the accuracy of the direction of the sound source to be determined, the procedure may be performed at least once, itinerantly for a first Doppler Effect frequency shift of the first microphone signal with respect to a first directional movement of the movable unit from an initial position, a second Doppler Effect frequency shift of the second microphone signal with respect to a second directional movement of the movable unit from an initial position, and a third Doppler Effect frequency shift of the third microphone signal with respect to a third directional movement of the movable unit from an initial position, and the motion tracking unit signals respectively for the first, second and third directional movement of the movable unit. Alternatively, the procedure may take into consideration of a sound level of the microphone signal with respective to a maximum and/or minimum amplitude while the movable unit is moving from the initial position, and the motion tracking unit signal for the directional movement of the movable unit.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A portable device for localizing a sound source in condition monitoring of the sound source, including:
    a microphone;
    a motion tracking unit, being adapted for tracking a movement of the portable device;
    a processing unit, being adapted for receiving a microphone signal and a motion tracking unit signal and obtaining information on a direction from which sound from the sound source arrives using the received microphone signal and the received motion tracking unit signal obtained during movement of the portable device; and
    wherein:
    the portable device is adapted for free movement;
    the processing unit is adapted for evaluating a first Doppler Effect frequency shift of a first microphone signal with respect to a first directional movement of the portable device from an initial position;
    the processing unit is adapted for providing the information on the direction depending on the first Doppler Effect frequency shift of the first microphone signal and a motion tracking unit signal for the first directional movement of the portable device;
    the processing unit is further adapted for evaluating a second Doppler Effect frequency shift of a second microphone signal with respect to a second directional movement of the portable device from the initial position; and
    the processing unit is adapted for providing the information on the direction depending on the first Doppler Effect frequency shift and the second Doppler Effect frequency shift of the first and second microphone signals and motion tracking unit signals for the first and second directional movements of the portable device.

2. The portable device according to claim 1, wherein the motion tracking unit is a gyroscope.

3. The portable device according to claim 2, wherein the processing unit is adapted for evaluating a sound level of the received microphone signal with respect to a maximum and/or a minimum amplitude while the portable device is moving with respect to an initial position.

4. The portable device according to claim 3, wherein the processing unit is adapted for providing the information on the direction depending on the sound level of the received microphone signal and the received motion tracking unit signal.

5. The portable device according to claim 1, wherein the motion tracking unit is a vision tracking system.

6. The portable device according to claim 5, wherein the processing unit is adapted for evaluating a sound level of the received microphone signal with respect to a maximum and/or a minimum amplitude while the portable device is moving with respect to an initial position.

7. The portable device according to claim 1, wherein the processing unit is further adapted for evaluating a third Doppler Effect frequency shift of a third microphone signal with respect to a third directional movement of the portable device from the initial position; and
    the processing unit is adapted for providing the information on the direction depending on the first, second and third Doppler Effect frequency shifts of the first, second and third microphone signals and motion tracking unit signals for the first, second and third directional movements of the portable device.

8. The portable device according to claim 1, wherein the processing unit is adapted for evaluating a sound level of the received microphone signal with respect to a maximum and/or minimum amplitude while the portable device is moving with respect to the initial position.

9. The portable device according to claim 8, wherein the processing unit is adapted for providing the information on the direction depending on the sound level of the received microphone signal and the received motion tracking unit signal.

10. The portable device according to claim 1, wherein the received motion tracking unit signal includes an initial position signal and a velocity signal for the movement of the portable device.

11. The portable device according to claim 1, further including:
    a screen, being adapted for optical visualizing a position of the sound source.

12. The portable device according to claim 1, wherein the portable device comprises a mobile phone.

* * * * *